(12) United States Patent
Carter et al.

(10) Patent No.: US 8,866,822 B2
(45) Date of Patent: Oct. 21, 2014

(54) ALTERNATE SOURCE FOR CONTROLLING AN ANIMATION

(75) Inventors: Benjamin F. Carter, Redmond, WA (US); Jevan D. Saks, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 12/876,778

(22) Filed: Sep. 7, 2010

(65) Prior Publication Data
US 2012/0056889 A1    Mar. 8, 2012

(51) Int. Cl.
    *G06T 13/00*     (2011.01)
(52) U.S. Cl.
    CPC ..................... *G06T 13/00* (2013.01)
    USPC .......................................................... 345/473
(58) Field of Classification Search
    CPC .............................. G06T 13/40; G06T 13/00
    USPC ............................. 345/473, 474, 684, 685, 47
    See application file for complete search history.

(56) References Cited

U.S. PATENT DOCUMENTS

| | | | | |
|---|---|---|---|---|
| 5,261,041 | A * | 11/1993 | Susman | 345/473 |
| 6,262,729 | B1 * | 7/2001 | Marcos et al. | 715/744 |
| 7,336,280 | B2 * | 2/2008 | Nelson et al. | 345/473 |
| 7,453,464 | B1 * | 11/2008 | Acquavella | 345/474 |
| 7,536,633 | B2 | 5/2009 | Faraday et al. | |
| 7,561,159 | B2 | 7/2009 | Abel et al. | |
| 7,598,956 | B2 * | 10/2009 | Strawn et al. | 345/473 |
| 7,924,285 | B2 * | 4/2011 | Brown et al. | 345/473 |
| 8,144,150 | B2 * | 3/2012 | Gilbert et al. | 345/440 |
| 2002/0008704 | A1 * | 1/2002 | Sheasby et al. | 345/475 |
| 2004/0034833 | A1 * | 2/2004 | Kougiouris et al. | 715/513 |
| 2005/0228608 | A1 * | 10/2005 | Wells | 702/127 |
| 2007/0245250 | A1 | 10/2007 | Schechter et al. | |
| 2009/0309881 | A1 * | 12/2009 | Zhao et al. | 345/473 |
| 2010/0016026 | A1 * | 1/2010 | Gouesbet et al. | 455/566 |
| 2010/0138773 | A1 | 6/2010 | Schechter et al. | |
| 2011/0199318 | A1 * | 8/2011 | Fong et al. | 345/173 |
| 2011/0202834 | A1 * | 8/2011 | Mandryk et al. | 715/701 |
| 2012/0134425 | A1 * | 5/2012 | Kossentini et al. | 375/240.25 |

OTHER PUBLICATIONS

Pete Brown, "Silverlight 3—UI Element to Element Binding", Mar. 18, 2009, http://10rem.net/blog/2009/03/18/silverlight-3-%E2%80%93-ui-element-to-element-binding.*

Krupa, "Element to Element Data Binding—p. 1", Jul. 29, 2009, http://www.kirupa.com/blend_silverlight/element_to_element_data_binding_pg1.htm.*

(Continued)

*Primary Examiner* — Javid A Amini
*Assistant Examiner* — Jin Ge
(74) *Attorney, Agent, or Firm* — Bryan Webster; Kate Drakos; Micky Minhas

(57) ABSTRACT

Techniques and tools described herein provide effective ways to program a property of a target object to vary depending on a source. For example, for a key frame animation for a property of a target UI element, an alternate time source is set to a property of a source UI element. When the target UI element is rendered at runtime, the animation changes the target value depending on the value of the property of the source UI element. Features of UI elements and animations can be specified in markup language. The alternate time source can be specified through a call to a programming interface. Animations for multiple target UI elements can have the same source, in which case different parameters for the respective animations can be used to adjust source values in different ways.

24 Claims, 11 Drawing Sheets

(56) References Cited

OTHER PUBLICATIONS

Krupa, "Element to Element Data Binding—p. 2", Jul. 29, 2009, http://www.kirupa.com/blend_silverlight/element_to_element_data_binding_pg2.htm.*

Sacha Barber, "WPF: A Beginner's Guide—Part 5 of n", May 22, 2008, http://www.codeproject.com/Articles/23772/WPF-A-Beginner-s-Guide-Part-5-of-n.*

Microsoft Corporation, "AnimationTimeline Class," 7 pp. (downloaded from World Wide Web on Sep. 7, 2010).

Microsoft Corporation, "Change Animation Interpolation Between Keyframes," 5 pp. (downloaded from World Wide Web on Jul. 2, 2010).

Microsoft Corporation, "Dependency Properties Overview," 9 pp. (downloaded from World Wide Web on Sep. 7, 2010).

Microsoft Corporation, "Expression Blend and Design—the Team Blog of the Expression Blend and Design Products," various entries, 58 pp. (downloaded from World Wide Web on Sep. 7, 2010).

Microsoft Corporation, "How to: Trigger an Animation When a Property Value Changes," 2 pp. (downloaded from World Wide Web on Sep. 7, 2010).

Microsoft Corporation, "Key-Frame Animations Overview," 9 pp. (downloaded from World Wide Web on Sep. 7, 2010).

Microsoft Corporation, "Property Animation Techniques Overview," 7 pp. (downloaded from World Wide Web on Sep. 7, 2010).

Microsoft Corporation, "Walkthrough: Create a Button by Using Microsoft Expression Blend," 21 pp. (downloaded from World Wide Web on Sep. 7, 2010).

Microsoft Corporation, "Windows Animation Tasks," 1 p., document marked: "Build date: May 7, 2010" (downloaded from World Wide Web on Jul. 1, 2010).

Microsoft Corporation, "XAML Overview (WPF)," 14 pp. (downloaded from World Wide Web on Sep. 7, 2010).

Moroney, "Silverlight—Create Animations with XAML and Expression Blend," 14 pp. (downloaded from World Wide Web on Sep. 3, 2010).

* cited by examiner

Figure 3a
301
```
public RelativeTo CreateRelativeTo(
    AnimationProperty property,
    int power,
    float multiply,
    float add)
```
Figure 3b
302
```
<Script>
  MyAnimation.TimeSource = MyTextViewItem.CreateRelativeTo(
    AnimationProperty.PositionX, 1, -1.0, 0.0);
</Script>
```
Figure 4a
401
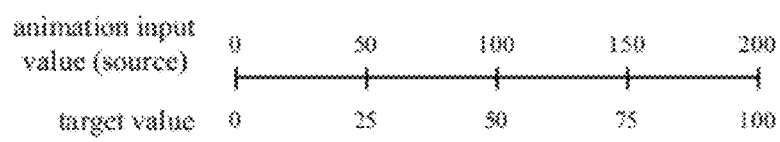
Figure 4b
402
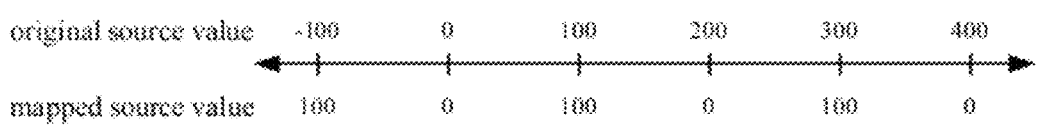

```
<Scroller Name="TheScroller" ScrollModel="{ScrollModel}" Orientation="Horizontal" Prefetch="480">
  <Children>
    <Panel Name="ScrollRoot" Layout="Dock">
      <Children>
        <Repeater Name="ContentRepeater"
                  Source="{ContentList}">
          <Layout>
            <FlowLayout Orientation="Horizontal" Repeat="Always"/>
          </Layout>
          <Content>
            <me:PaneItem Model="{(me.PaneModel)RepeatedItem}"/>
          </Content>
        </Repeater>
      </Children>
    </Panel>
  </Children>
</Scroller>
```

```
<Script>
  RelativeTo ScrollRootRelativeTo =
    ScrollRoot.CreateRelativeTo(AnimationProperty.PositionX, 1, 1.0, 0.0);
</Script>
```

Figure 6c    603

```
<Locals>
  <Animation Name="HeaderAnimation" Type="Idle" Loop="-1">
    <PositionXKeyframe Time="0" Value="0"/>
    <PositionXKeyframe Time="1" Value="1"/>
  </Animation>
</Locals>
<Script>
  HeaderAnimation.TimeSource = Model.ScrollRootRelativeTo;
</Script>
```

Figure 6d    604

```
<Script>
  [DeclareTrigger(HeaderLabel.LayoutOutput.Size)]

PositionXKeyframe keyframe = (PositionXKeyframe) HeaderAnimation.Keyframes[1];
  keyframe.Time = (float)(HeaderLabel.LayoutSize.Width * 2);
  keyframe.Value = (float)HeaderLabel.LayoutSize.Width;

UpdateAnimation();
</Script>
```

Figure 6e 605

```
<Script>
  [DeclareTrigger(HeaderLabel.LayoutOutput.Size)]

PositionXKeyframe keyframe;

keyframe = new PositionXKeyframe();
  keyframe.Time = 0.0;
  keyframe.Value = 0.0;
  HeaderAnimation.Keyframes.Add(keyframe);

keyframe = new PositionXKeyframe();
  keyframe.Time = (float)(HeaderLabel.LayoutSize.Width * 2);
  keyframe.Value = (float)HeaderLabel.LayoutSize.Width;
  HeaderAnimation.Keyframes.Add(keyframe);

UpdateAnimation();
</Script>
```

Figure 6f 606

```
<Script>
  [DeclareTrigger(Model.PanoramaScrollingModel.IsScrolling)]
  UpdateAnimation();
</Script>

<Methods>
  void UpdateAnimation()
  {
    if (Model.PanoramaScrollingModel.IsScrolling)
    {
      HeaderLabel.AttachAnimation(HeaderAnimation);
    }
    else
    {
      HeaderLabel.DetachAnimation(AnimationEventType.Idle);
    }
  }
</Methods>
```

Figure 6g 607

```
<Animation Name="HeaderAnimation" Type="Idle" Loop="-1">
    <TimeSource>
      <RelativeTo RelativeTo="{Model.ScrollRootRelativeTo}"/>
    </TimeSource>
    <Keyframes>
      <PositionXKeyframe Time="0" Value="0"/>
      <PositionXKeyframe Time="1" Value="1"/>
    </Keyframes>
</Animation>
```

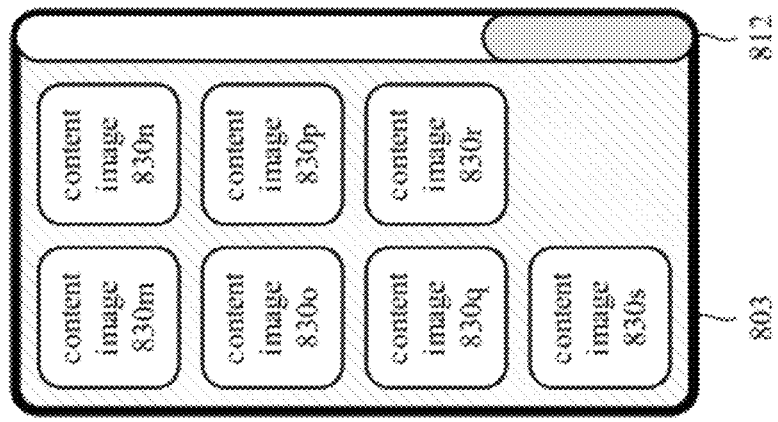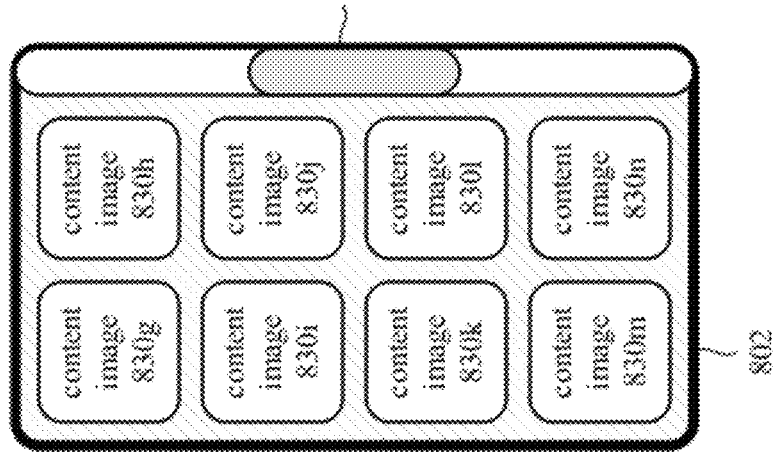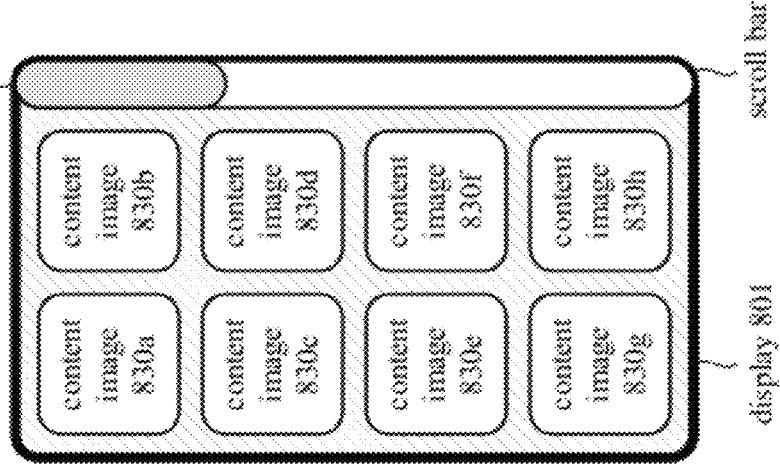

ALTERNATE SOURCE FOR CONTROLLING AN ANIMATION

BACKGROUND

When designing a user interface (UI), a software developer sometimes creates a UI element having a property that is dependent on the property of a second UI element or other source. A change to the property of the second UI element (or other source) causes a change to a property of the first UI element. For example, the size of an image graphic can be programmed to change depending on the size of a window that includes the image graphic. When the size of the window changes, the size of the image graphic changes accordingly. Or, as another example, the sliding scroll indicator in a scroll bar can be programmed to slide to different positions within the scroll bar depending on which part of a list of content is in a display area. When a user scrolls to view a different part of the content, the scroll indicator changes positions.

When programming a property of a UI element to be dependent on a source value, a developer can program software to compute the value of the property as a function of the source value. A code function is one common way to compute the property value. A typical code function accepts the source value as a parameter (or otherwise gets the source value) and returns the value of the property of the first UI element. In some software systems, code functions are simple to implement and run quickly. In other systems, however, code functions can be difficult to implement or slow to run. In particular, in systems in which UI elements are specified in markup language that is processed to render the UI elements, accessing a code function can be difficult or slow. Such systems are common for UI rendering in mobile computing devices and other computing devices.

SUMMARY

Techniques and tools described herein provide effective ways to program a property of a target object (such as a UI element) to vary depending on a source. In example implementations, a key frame animation is set to change the value of the property of the target object depending on the value of the source. In such example implementations, features of the target object and key frame animation can be specified in markup language, which simplifies programming for the target object and animation.

According to a first aspect of the techniques and tools described herein, a computing device determines an animation for a target graphical user interface (GUI) element and sets an input of the animation to relate to a property of a source GUI element. The target and source GUI elements are graphical features of the UI. The target GUI element and animation can at least in part be defined in markup language that the computing device processes, or they can be specified in some other way. At runtime, the computing device renders for display the target GUI element according to the animation and value of the property of the source GUI element. For example, to render the target GUI element, the computing device iteratively determines the value of the property of the source GUI element, adjusts the value according to one or more adjustment parameters, normalizes the adjusted value according to duration of the animation, and interpolates within the animation to compute a value of the target GUI element at the normalized, adjusted source value. In this way, the value of the property of the target GUI element changes as a function of the value of the property of the source GUI element. This provides a simple way to animate one graphical feature of a UI depending on the value of a property of another graphic feature of the UI.

In example implementations, the animation includes one or more key frames. The key frame(s) specify variations in the value of the property of the target GUI element. The key frame(s) can be added when processing markup language with statements defining the animation and target UI element, or the key frame(s) can be added when processing a script separate from the markup language, or the key frame(s) can be added by some other mechanism.

A programming interface can simplify the process of specifying the relationship between the target and source GUI elements. For example, when the computing device sets the input for an animation, the computing device calls a programming interface that returns a source variable whose value depends on value of the property of the source GUI element, then assigns the source variable to an animation input property of the animation.

The computing device can repeat the process for one or more other target GUI elements. For example, the computing device sets an input of a second animation to relate to the property of the source GUI element, where the second animation is for a second target GUI element. At runtime, the computing device then renders the second target GUI element according to the second animation and the value of the property of the source GUI element. In this way, the rendering of multiple target GUI elements changes as a function of the same property of the source GUI element.

According to a second aspect of the techniques and tools described herein, a computing device provides a programming interface that facilitates binding of an input of an animation to a given source other than time. The animation specifies variations in value of a property of the target object. The device receives a call to the programming interface and returns from the call. For example, the call returns a source variable whose value depends on value of the given source. The call to the programming interface can include a property parameter that identifies the given source and can include one or more adjustment parameters that indicate adjustments to the value of the given source. In some cases, the value of the given source is a scalar floating point value, and the adjustment parameters include a multiplier, an exponent and/or an offset according to which the value of the given source is adjusted.

The device can also process a specification for the animation. For example, the specification includes one or more statements that at least in part define the animation and one or more statements that set the input of the animation to the given source other than time. The specification can also include one or more statements defining a key frame for the animation, where the key frame indicates a specific point in the variations in the value of the property of the target object.

According to a third aspect of the techniques and tools described herein, a computing device with a rendering engine determines multiple animations for different target objects and iteratively renders the target objects at runtime. Each of the multiple animations specifies variations in value of a property of one of the target objects. When animation inputs of the respective animations are set to the same non-temporal source, changes to the value of the source cause changes to the respective target object properties. This provides a simple way to animate multiple target objects depending on the value of the same source.

The computing device determines a first animation that specifies variations in value of a first target object property. The computing device also determines a second animation that specifies variations in value of a second target object property. The animation input for the first animation and the animation input for the second animation are set to a given source other than time. As part of iterative rendering of the first and second target objects at runtime, the computing device evaluates the first animation based on the value of the given source, computing the value of the first target object property, and the computing device evaluates the second animation based on the value of the given source, computing the value of the second target object property. For example, the evaluation includes adjusting the value of the source for purposes of a given animation, normalizing the adjusted value according to length of the given animation (where, for a typical key frame animation with key frames that set different property values for different times, the length of the animation is the duration defined by the times of the key frames), and interpolating within the given animation to compute the value of the target object property at the normalized, adjusted source value.

In example implementations, an animation includes key frames that define different property values for different values of the animation input. (For a typical key frame animation, the values of the animation input are by convention labeled as "time" values in key frames, even if the animation input for the animation is bound to a non-temporal source.) Each of the key frames indicates a different value of the property of the target object for a different value of the animation input. The key frames can be added when processing markup language that includes statements that at least in part define the animation. Or, the key frames can be added when processing a script separate from such a markup language specification.

Different parameters for the multiple animations can be used to adjust the value of the given source in different ways. For example, when the first animation is evaluated, the value of the given source is adjusted according to one or more first parameters (e.g., for a multiplier, exponent and/or offset) that indicate how to adjust the value of the given source for purposes of the first animation. When the second animation is evaluated, the value of the given source is adjusted according to one or more second parameters that indicate how to adjust the value of the given source for purposes of the second animation. When one of the first parameters differs from a corresponding one of the second parameters, evaluation of the same source value during rendering can yield different results. This provides a simple yet flexible way to adjust the value of the source for different target objects.

Similarly, the computing device can create different source variables whose values depend on the value of the given source, then assign the different source variables to the animation inputs of the respective animations. For example, the computing device creates a first source variable whose value depends on the value of the property of the given source, and sets the animation input of the first animation to the first source variable. The computing device also creates a second source variable whose value depends on the value of the property of the given source, and sets the animation input of the second animation to the second source variable. The values of the first and second source variables can also depend on adjustment parameters (e.g., for a multiplier, exponent and/or offset) specified for the respective source variables.

The computing device can repeat the process for other target objects. For example, the computing device performs the determining and the rendering for each of one or more other target objects. In doing so, the computing device can use the same source for two of more of the target objects, or use different sources for different target objects.

The foregoing and other objects, features, and advantages of the invention will become more apparent from the following detailed description, which proceeds with reference to the accompanying figures.

BRIEF DESCRIPTION OF THE DRAWINGS

FIGS. 3a and 3b are pseudocode listings for a definition and use, respectively, of an example programming interface that returns a source variable for use as an alternate source for an animation.

FIGS. 4a and 4b are diagrams illustrating example mechanisms used when mapping a source value to a value of a property of a target object.

FIGS. 6a-6f are pseudocode listings for the example UI of FIG. 5, and FIG. 6g is a pseudocode listing showing an alternative way to assign an alternate time source for an animation.

FIGS. 8a-8c are diagrams showing re-positioning of a scroll indicator of a scroll bar in a UI, where the positions of the indicator are varied according to a key frame animation whose source is set to vertical position of scrolling content.

DETAILED DESCRIPTION

Techniques and tools described herein provide effective ways to program a property of a target object (such as a UI element) to vary depending on a source. For example, a key frame animation is set to change the value of the property of the target object depending on the value of the source. In example implementations, features of a target object and animation are specified in markup language that is processed to render the target object. Many markup languages provide animation features. Animation timelines for such animations, however, use time as their input. Allowing specification of an alternate input (other than time) for an animation timeline provides an effective way for developers to author a function in a markup language animation framework.

Generally, techniques and tools described herein can be implemented with mobile computing devices or other computing devices. Computer-readable media can store computer-executable instructions for causing a processor programmed thereby to perform one or more of the techniques described herein. The various techniques and tools can be used in combination or independently. Different embodiments implement one or more of the described techniques and tools. Some of the techniques and tools described herein solve one or more of the problems described in the Background section but techniques and tools described herein need not solve such problems.

I. Example Technique for Rendering an Animation with an Alternate Time Source.

Figure 1:
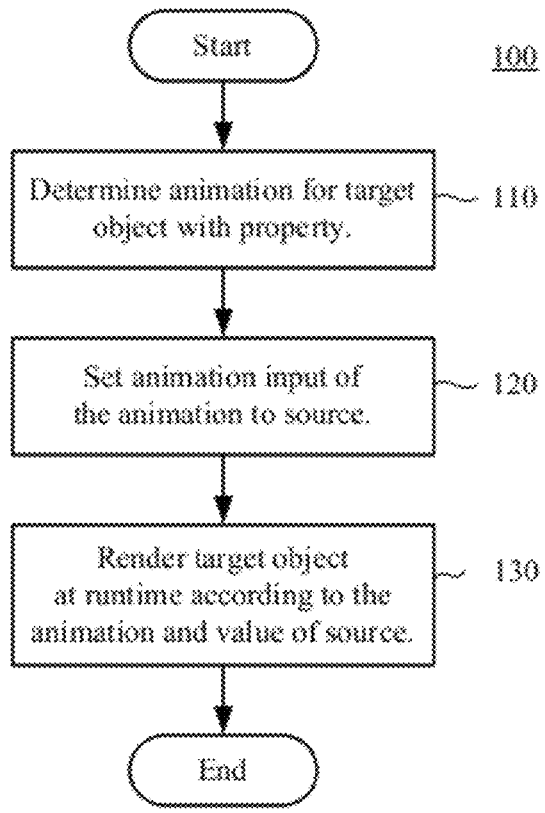
FIG. 1 is a flow chart showing an example technique for rendering an animation whose animation input is set to a source other than time.

FIG. 1 shows a generalized technique (100) for rendering an animation whose animation input is set to a source other than time. A mobile computing device or other computing device performs the technique (100). The device implements a rendering engine, which is any combination of software and/or hardware adapted for rendering animations for target objects. A target object can be a GUI element such as a control, label or other graphical feature of the UI that is specified in software. Or, a target object can be another software object having a property to be animated. The property can be width, height, horizontal scale, vertical scale, horizontal position, vertical position, opacity or any other changeable feature of the target object. Depending on implementation, the property can be represented as a field, member, attribute or other feature of a data structure, software object, data type or other representation of a target object. The source can be a GUI element. Or, the source can be something other than a graphical feature of the UI that is specified in software. For example, the source can be the state of a hardware resource such as physical memory, battery, or processor capacity, or the source can be the state of a software resource such as addressable memory or buffer size. Depending on implementation, the animation can have an animation input property (e.g., field, member, attribute or other feature of a data structure, software object, data type or other representation of the animation) to which an arbitrary source is bound, or without any change to the animation the input routed to the animation can be replaced, switched or overloaded in order to set the input of the animation to a source other than time.

The device determines (110) an animation for a target object that has a property. Generally, the animation specifies variations in the value of the property of the target object depending on which input value is provided by the animation input for the animation. In example implementations, by analogy to conventional key frame animations, the animation input is alternately termed the time source for the animation. Changes to value of the animation input of the animation are associated with changes in value for the property of the target object. The animation can be a key frame animation for which key frames specify variations in value of the property of the target object, or the animation can be another type of animation. Depending on implementation, the determination (110) of the animation by the device can include simply identifying or providing an animation that was previously specified, or it can also include defining one or more features of an animation.

The device sets (120) the animation input of the animation (for the property of the target object) to a source other than time. For example, the source is a property of a source GUI element, and the device sets the animation input to relate to the property of the source GUI element. In example implementations, the device sets the animation input by creating a source variable whose value depends on the value of the source, then assigning the source variable to the animation input of the animation. For example, the device calls a programming interface that returns the source variable, then assigns the source variable to a source property of the animation. The source variable can also depend on one or more adjustment parameters that are specified for the source variable. Alternatively, the device sets the animation input of the animation using another mechanism.

At runtime, the device renders (130) the target object according to the animation and the value of the source. The device iteratively determines the value of the source and evaluates the animation for the determined value of the source, computing a value of the property of the target object. For example, the device adjusts the value of the source according to one or more adjustment parameters, normalizes the adjusted source value according to length of the animation (such as a duration defined by key frames), and interpolates within the animation to compute a value of the property of the target object at the normalized, adjusted source value. In this way, the value of the property of the target object changes as a function of the value of the source that is set to be the animation input of the animation.

In example implementations, the value of the property of the target object and the value of the source are scalar floating point values that represent, e.g., width, height, opacity, horizontal position, vertical position, or another value in one dimension. When the animation input is set for an animation, one or more parameters can be specified that indicate an adjustment to the value of the source (e.g., a multiplier, exponent, offset, or other adjustment to the value of the source). When the target object is rendered, the device adjusts the value of the source according to the parameter(s). Alternatively, the device renders the target object using another approach.

FIG. 1 illustrates rendering for an animation for a single target object. The device can repeat the technique (100) for each of one or more other target objects. In doing so, the device can set the source for two or more of the target objects to be the same, or the device can set the source to be different for different target objects. For example, in addition to performing the technique (100) for a first animation for a first target object, the device determines (110) a second animation for a second target object and sets (120) the animation input for the second target object to the source other than time. As part of the rendering (130), the device renders the second target object according to the second animation and the value of the source. In this way, the rendering of the first and second target objects changes as a function of the same source. Even when different animations are tied to the same source, however, different adjustment parameters can be specified and evaluated for the animations (e.g., to indicate a different multiplier, exponent, offset and/or other adjustment to the value of the source for the respective animations).

Some conventional animation authoring tools allow an author to "scrub through" an animation to evaluate the animation at different times during development. For example, the author moves a graphical time indicator in the UI of the authoring tool to change which time is evaluated for the animation. Mouse cursor location or the location of the time indicator may temporarily affect how the animation is evaluated during authoring. When the animation is finalized, however, the time source for the animation is set so that actual time is the input for rendering at runtime. In contrast, according to example implementations described herein, an alternate time source is specified for an animation to provide values that the animation uses for evaluation at runtime. In this way, the animation input for an animation can be bound to any changeable property in a UI rendering environment.

The device can perform the technique (100) when parsing or otherwise processing markup language that includes statements about the target object and/or animation. For example, the markup language can include one or more statements at least in part defining the target object and animation and one or more statements setting the animation input for the animation. Or, the device can perform the technique (100) for an animation and target object defined in some other way.

Finally, although FIG. 1 shows the acts of determining (110), setting (120) and rendering (130) in succession, the acts can be performed in different order when rendering animations for multiple target objects. For example, a device can perform the determining (110) and setting (120) for each of multiple target objects. Later, possibly after saving the results of the setting, the same device or a different device can determine (110) the animations for which the animation inputs were set, then perform the rendering (130) for the multiple target objects.

II. Example Software Architecture.

Figure 2:
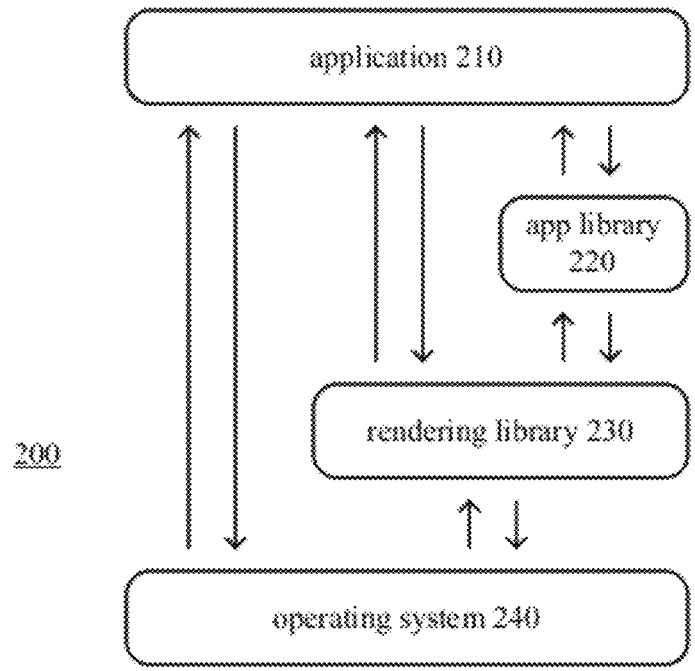
FIG. 2 is a diagram showing an example UI rendering architecture for key frame animations with alternate sources.

FIG. 2 shows an example software architecture (200) that includes an application (210), application library (220), rendering library (230) and operating system (240). The software architecture (200) can be implemented on a smartphone, handheld gaming device, other mobile computing device or other computing device. Animations for example controls, UI elements and other target objects described herein can be rendered using the software architecture (200).

The application (210) is software that provides functionality to a user. For example, the application (210) is a media player, a game, an organizer for media or games, an email client, a telephone application or any other software that provides functionality to a user. In FIG. 2, the application (210) uses services provided by the application library (220), the rendering library (230) and the operating system (240).

The application library (220) implements functionality for the application (210) that is common to multiple applications. In this way, the multiple applications can reuse the same library (220). In FIG. 2, the application library (220) provides services to the application (210) and uses services provided by the rendering library (230). The application library (220) can also use services provided by the operating system (240).

The rendering library (230) provides services to the application (210) and application library (220), and the rendering library (230) uses services provided by the operating system (240). In example implementations, the rendering library (230) implements software for playing key frame animations. The key frame animation processing is conventional in most respects. The rendering library (230) has been modified, however, to implement a programming interface that is exposed to the application (210) and/or application library (220). The application (210) and/or application library (220) can call the programming interface to create and receive a source variable for a key frame animation. When an alternate source is specified for the animation, the rendering library (230) plays the animation according to values from the alternate source.

The operating system (240) provides services to the application (210), application library (220) and rendering library (230). The operating system (240) can be an operating system adapted for a mobile computing device or other operating system. One or more modules in the operating system (240) convert user input from a touchscreen, directional buttons on a keypad or keyboard, trackball, microphone or other input device into recognized UI events (e.g., a button click), gesture messages (e.g., in response to a panning or flick gesture by the user interacting with a touchscreen), navigation messages or other information that can be used in UI rendering. The operating system (240) can provide such events, messages, etc. to the application (210), application library (220) and rendering library (230). The events, messages, etc. generated in response to user input are translated into direct UI manipulation events for UI elements being rendered.

Within the rendering library (230) and/or operating system (240), one or more modules receive a markup language specification or other declarative description of one or more animations and UI elements. Generally, a declarative description includes information that defines UI elements. The declarative description can be provided to markup generator, along with other information such as style information and/or configuration properties, and the markup generator generates markup language that can be used to render the UI elements. For layout, UI rendering requests are generated from the markup language description as well as direct UI manipulation events and other commands. The rendering library (230) and/or operating system (240) include one or more modules for playing animations based on the markup language specification and laying out UI elements for rendering. The operating system (240) includes one or more modules for receiving rendering requests and causing a rendered UI to be output for display.

Alternatively, the software architecture (200) includes more or fewer layers. For example, a given layer can be split into multiple layers, or different layers can be combined into a single layer. Functionality described with reference to one layer (e.g., rendering functionality, programming interface for alternate time source) can in some cases be implemented as part of another layer.

III. Example Programming Interfaces and Parameters.

A programming interface provides a way for a developer to specify an input other than time for an animation input for a property of a target object. For example, a computing device provides a programming interface that facilitates binding of an animation input of an animation to a given source other than time. The programming interface can be implemented as part of a rendering library, as part of an operating system, or as part of other software. The computing device receives a call to the programming interface and then returns from the call. For example, the call returns a source variable whose value depends on value of the given source, where the source variable can then be assigned to the animation input. Or, the computing device sets the animation input to the given source as part of programming interface implementation processing and then returns from the call. By setting an alternate source for the animation input (which provides input values evaluated like times along a timeline for the animation) using the programming interface, the developer can easily specify the property of the target object as a function of an arbitrary input. Depending on implementation, the programming interface can be an application programming interface or other system-provided software routine, or a method, function or other software routine provided as part of a software library or other software object.

In example implementations, an application or other software calls a programming interface to create a source variable. The source variable will propagate a source's value to an animation input, effectively making the source's value the input for the animation timeline. A property of the animation is set to the source variable, or the animation receives the source variable using some other mechanism. In this way, as the value of the source changes, the animation evaluates to different values for the property of the target object.

For example, an animation and target object can be defined, at least in part, by a specification such as a markup language document in a format suitable for processing by a rendering engine. The specification for the animation and target object includes one or more statements that, at least in part, define the animation for the target object. Other features of the animation and target object can be defined in one or more separate files, such as other markup language documents, other source code files, or other software libraries. The animation specifies variations in value of a property of the target object. The specification also includes one or more statements that set the time source (animation input) of the animation to a given source other than time. In particular, the specification includes a call to a programming interface that returns a source variable whose value depends on value of the given source. The call to the programming interface can include a property parameter and one or more adjustment parameters. The property parameter identifies the given source. The adjustment parameter(s) indicate adjustments to the value of the given source (e.g., when the value of the source is a scalar, a multiplier, exponent and/or offset for the value of the source). The specification can also include one or more statements defining a key frame for the animation.

FIG. 3a is a pseudocode listing (301) for a definition of an example programming interface that returns a "RelativeTo" value for accessing a property of a source object for use as an alternate time source. In FIG. 3a, the source object has a type of ViewItem, where a ViewItem is a visual element in the UI. The member function ViewItem.CreateRelativeTo provides a way to access a specified property of the ViewItem and have that property used by an animation. Aside from a parameter indicating the property, the CreateRelativeTo method accepts three parameters that specify adjustments to the specified animation property, as shown in Table 1.

TABLE 1

Parameters of ViewItem.CreateRelativeTo.

| Parameter Name | Type | Value |
|---|---|---|
| property | AnimationProperty | the source property x to query |
| power | int | an exponent p |
| multiply | float | a multiplier m |
| add | float | an offset a |

For the example programming interface of FIG. 3a, possible types for the animation property include opacity (Alpha), horizontal position (PositionX), vertical position (PositionY), width (SizeX), height (SizeY), horizontal scale (ScaleX) and vertical scale (ScaleY). Each of these is represented using a scalar floating point value. Alternatively, the animation property can be set to another type and/or represented with another value. At runtime, the queried source value x is modified by the exponent p, multiplier m and offset a according to the formula $(m \times x^p)+a$. Alternatively, the queried source value can be modified according to another value function.

FIG. 3b is a pseudocode listing (302) for a use of the example programming interface of FIG. 3a. The TimeSource property of the animation MyAnimation is set to the source variable returned by a call to MyTextViewItem.CreateRelativeTo for the source object MyTextViewItem. MyTextViewItem is a visual element in the UI. In FIG. 3b, the animation property is PositionX, and the three adjustment parameters are p=1, m=−1.0 and a=0.0. At runtime, the value of PositionX of MyTextViewItem is queried, the queried value PositionX is adjusted according to the parameters, and the adjusted source value −PositionX is returned. In this way, the TimeSource property provides the means for specifying an alternate source for MyAnimation.

In some scenarios, multiple target objects are animated according to the same source. In such scenarios, different calls to the programming interface can specify different adjustment parameters for different source variables. With this flexibility, a value from the same source can be adjusted in different ways for different target object properties. For example, a control can be authored for which animations of different UI elements are set to the same alternate source, but change positions of the respective UI elements at different rates to provide a parallax effect.

Calls to the programming interface can be set in a markup language specification for the animation and target object. Or, calls to the programming interface can be set in a script or other programming language document.

IV. Example Key Frame Animations.

Conventionally, a key frame animation specifies variations in the value of a target object property at different times along an animation timeline. An individual key frame indicates a value of the target object property for a given time along the timeline. In example implementations, the time source (animation input) for a key frame animation is set to a source other than time such that different source values correspond to different times along the timeline (input values) for the animation, and such that changes to the source value result in changes to the value of the target object property. Complex controls can be created with key frame animations that are not time-based. Providing the ability to specify an alternate source allows for authoring within a key frame framework while also permitting binding of an animation to the alternate source.

A conventional key frame animation has a timeline that starts at zero, may include one or more key frames at intermediate times relative to the start, and ends at a time defined by the last key frame. The duration of the animation is the difference between the time defined by the last key frame and the time defined by the first key frame (or default 0). By interpolation, a value for the target object property can be determined for any time within the duration of the timeline.

In example implementations, key frames define values of a target object property for different input values from a source. FIG. 4a illustrates an approach (401) that uses linear interpolation to determine values for a target object property. A key frame sets the value of the target object property to be 100 when the animation input value is 200. By linear interpolation, any input value in the range of 0 . . . 200 can be mapped to a corresponding target property value in the range of 0 . . . 100. Alternatively, instead of linear interpolation, the interpolation can be splined interpolation, interpolation along a Bezier curve or another type of interpolation. The type of interpolation can be defined for the device or specified for a given animation. The length of the key frame animation is the difference between the input value defined by the last key frame and the input value defined by the first key frame (or default 0).

In general, the value of a source has a range, and the animation has a length. The range of the source value can be the same as the length of the animation (e.g., both 0 . . . 200, or both 0.0 . . . 1.0). In many instances, however, the length of the animation is different than the source value range, especially when the value of the source is adjusted according to a multiplier, exponent, offset or other parameter during rendering. Moreover, different animations can have different lengths even when set to the same source. When an animation length is different than the source value range, the source value is adjusted to fit within the animation length.

For example, suppose a first animation has a first length, and a second animation has a second length different than the first length. The value of a given source has a source value range different than the first and second animation lengths. When the first animation is evaluated during rendering, the value of the given source is normalized to the first animation length. When the second animation is evaluated during rendering, the value of the given source is normalized to the second animation length.

FIG. 4b illustrates an approach (402) to mapping the value of a source from a source value range to a normalized value range that matches the length of an animation. When an alternate source is specified for an animation, in some cases the source provides values that are negative or that "jump" around within a source value range. To compensate, a source value outside the animation length is mapped to a value within the animation length according to:

$$source\_mapped = (source\_original - anim\_min) \% (anim\_max - anim\_min),$$

where anim_min is the minimum input value defined for the animation, anim_max is the maximum input value defined for the animation, the % operator is defined as $$x \% y = x - y \left\lfloor \frac{x}{y} \right\rfloor,$$

and $\lfloor \ \rfloor$ indicates rounding downward to the nearest integer. Thus, for example, for a mapped source range (animation length) of 0 . . . 100, the original source value of −23 is mapped to a modified source value of 77, the original source value of 14 is mapped to a modified source value of 14, and the original source value of 120 is mapped to a modified source value of 20. Alternatively, the device uses another approach to map original source values to normalized source values within a key frame animation.

Key frame animations can be authored in a markup language such as Extensible Application Markup Language (XAML), which is a descriptive programming language for creating UIs, or authored in another variation of extensible markup language (XML). In general, constructs in a XAML file specify UI features and may in turn call or reference other code. An authoring tool can allow a user to specify key frames and alternate sources for animations directly in markup language. Alternatively, key frame animations and their sources are specified using a graphical animation authoring tool that generates markup language output from higher level instructions. When key frames are known when markup is authored, key frames can be added at that time. Otherwise, key frames can be added by a separate script.

V. Example Animations of UI Elements.

Figure 5:
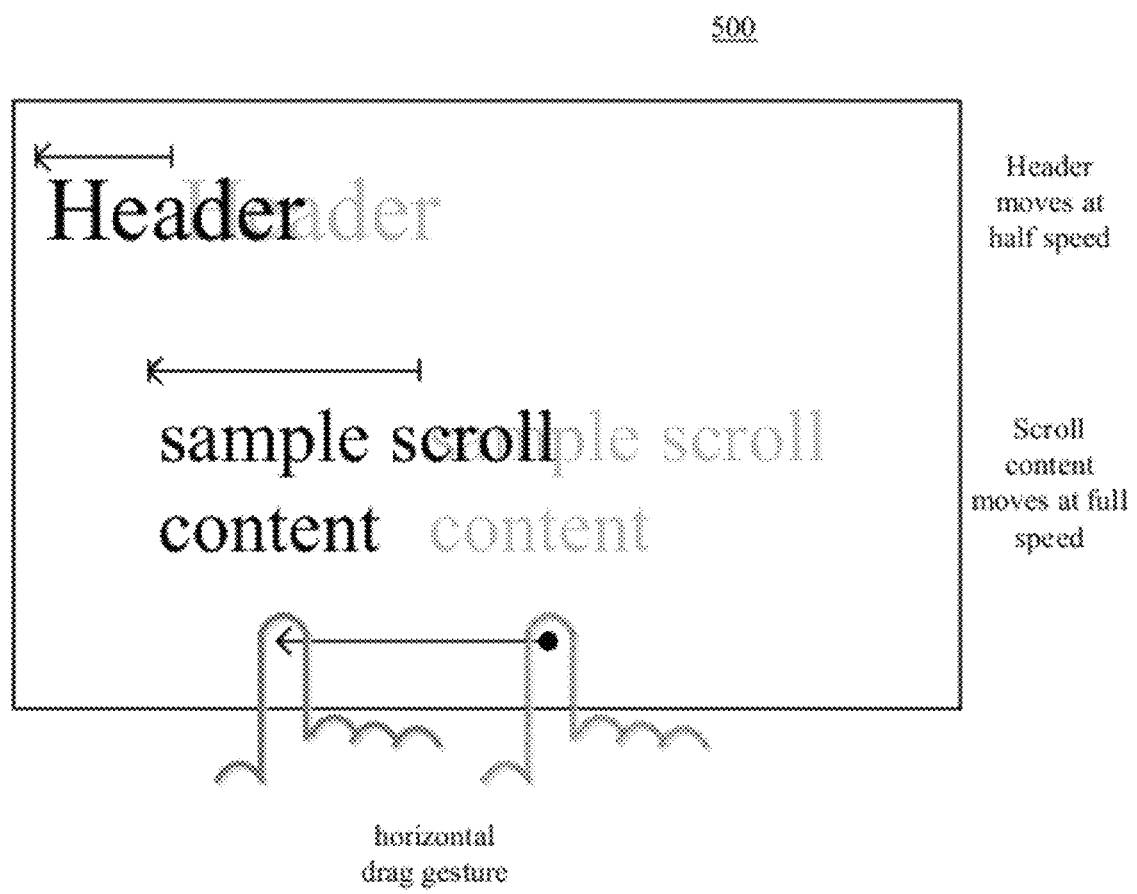
FIG. 5 is a diagram of an example UI in which a key frame animation for a header has its animation input (time source) set to the horizontal position of scrolling content

FIG. 5 is a diagram of an example UI (500) in which a simple key frame animation for the horizontal position for a header label has its animation input set to the horizontal position of scrolling content. In the example UI (500), a header label "Header" and scroll content are shifted horizontally in response to a horizontal drag gesture from the user. An animation for the header label changes the horizontal position of the header label (horizontal coordinate of top left corner) depending on the horizontal position of the scroll content. Specifically, according to the animation, the horizontal position of the header label changes at one half the rate of the horizontal position of the scroll content, and changes in the same direction.

FIGS. 6a-6f are pseudocode listings for the example UI of FIG. 5. The pseudocode is generally based on a markup language. The example of FIGS. 5 and 6a-6f is simplified to illustrate basic operations of a key frame animation with a non-temporal source. FIGS. 7a-7d and 8a-8c illustrate more complex animations.

In the listing (601) of FIG. 6a, statements define features of a panel named ScrollRoot. As a container for content, the panel controls the positioning and rendering of the content. The panel includes a repeater, which is a control that repeats a specified template for each item in a list. According to the listing (601), the items of the list are laid out in a horizontal orientation.

The listing (602) of FIG. 6b shows a call to the CreateRelativeTo programming interface for the panel ScrollRoot. In the call, the property parameter identifies a source property to query −AnimationProperty.PositionX. Three other parameters specify an exponent p=1, multiplier m=1.0 and offset a=0.0 for adjustment of the queried source value at runtime. The call returns a source variable named ScrollRootRelativeTo, which can be passed around in model classes to other UIs. Once accessible, the variable ScrollRootRelativeTo can be assigned to be the animation input of an animation for another UI element.

The listing (603) of FIG. 6c shows statements that in part define an animation named HeaderAnimation that will be associated with a header label UI element. The animation is an idle animation that loops endlessly. The listing (603) shows two key frames for which default conventional times are associated with default horizontal position values. The listing (603) also shows assignment of the source variable ScrollRootRelativeTo to the TimeSource property of the animation. In this way, even though the key frame animation is conventional in most respects, the time source for HeaderAnimation is changed, with the source values acting as times for purposes of key frame evaluation.

Once information is available to the UI to calculate the animation, key frames can be added to the animation. The listing (604) of FIG. 6d shows the addition of a key frame when the number of key frames is known at the time markup language is authored. In the listing (604), the header label named HeaderLabel has a property LayoutSize.Width. A PositionXKeyFrame type key frame is added for which the input value (keyframe.Time) is double the width of the header label, and the corresponding horizontal position value is the width of the header label. The new key frame defines the extreme at which the maximum horizontal position value is used. (Another, default key frame defines the other extreme at which the minimum horizontal position of zero is used.) The routine UpdateAnimation( ) is then called.

If the number of key frames is not known at markup time, key frames can nevertheless be added through a script. FIG. 6e shows a listing (605) that adds two key frames through a script. As in FIG. 6d, a header label has a property LayoutSize.Width. A first new PositionXKeyFrame type key frame defines the extreme at which the minimum horizontal position of zero is used. The first new key frame is added to the animation. Then, a second new PositionXKeyFrame type key frame defines the other extreme at which the maximum horizontal position value is used. For the second new key frame, the input value (keyframe.Time) is double the width of the header label, and the corresponding horizontal position value is the width of the header label. The second new key frame is added to the animation, and UpdateAnimation( ) is called.

In the UpdateAnimation( ) routine shown in the listing (606) of FIG. 6f, the animation HeaderAnimation is conditionally attached to HeaderLabel through a call to a member function of HeaderLabel. The member function AttachAnimation is called when scroll position is changing, as indicated by the IsScrolling property. Alternatively, another property can be used to trigger the animation, such as when the Scroller is programmatically scrolled. In any case, running the animation when the scroll position is changing provides the desired adjustments to horizontal positions of the target UI element. On the other hand, stopping the animation when the scroll position is not changing (by programming the animation to detach when the animation is idle) avoids unnecessary evaluation of target values and helps save battery life.

Table 2 shows example target values for horizontal position of the visual element HeaderLabel for different source values for horizontal position of the scroll content. For Table 2, the width of the header label is 100. An original source value is adjusted according to the parameters p=1, m=1.0 and a=0 (in effect, no adjustment for this example). The adjusted source value is mapped to the length of the animation, which has a range of 0 . . . 200, according to the approach explained with reference to FIG. 4b:

$$\text{source\_mapped} = (\text{source\_adj} - 0)\%(200 - 0)$$

$$= \text{source\_adj} - 200\left\lfloor \frac{\text{source\_adj}}{200} \right\rfloor.$$

The target value is then interpolated using linear interpolation, given the mapped source value.

TABLE 2

Derivation of Example Target Values for Header Label

| Original Source Value (PositionX for Scroll Content) | Adjusted Source Value (m = 1.0) | Mapped Source Value (for Animation Length) | Target Value (PositionX for HeaderLabel) |
|---|---|---|---|
| −80 | −80 | 120 | 60 |
| −40 | −40 | 160 | 80 |
| 0 | 0 | 0 | 0 |
| 40 | 40 | 40 | 20 |
| 80 | 80 | 80 | 40 |
| 120 | 120 | 120 | 60 |
| 160 | 160 | 160 | 80 |
| 200 | 200 | 0 | 0 |
| 240 | 240 | 40 | 20 |

The listing (607) of FIG. 6g shows an alternative way to assign the source for the animation HeaderAnimation. As in the listing (603) of FIG. 6c, the animation is an idle animation that loops endlessly, and two key frames associate default conventional times with default horizontal position values. The listing (607) shows a different way, however, to assign the TimeSource of the animation.

FIGS. 7a-7d show re-positioning of target UI elements in a control, where the horizontal positions of the target UI elements are varied according to key frame animations. In FIGS. 7a-7d, key frame animations for the target UI elements are set to the same source (horizontal position of scroll content), but the target UI elements scroll at different rates for a parallax effect. This can be accomplished, for example, by specifying different adjustment parameters or using different key frame animation lengths for the respective target UI elements.

In FIGS. 7a-7d, scrolling content (730a-730g) is scrolled horizontally according to finger gesture input on a touchscreen display. The scrolling content (730) can be images, graphical icons, text lists or other information to be presented visually. The scrolling content (730) moves at a base rate that corresponds to the rate indicated with gesture input. The other UI elements are set to scroll in the same direction as the scrolling content (730) but at different rates. The background image (750) is set to scroll horizontally at a rate much less than the base rate. The header label (710) and category label (720) are also set to scroll at slower rates than the content (730).

Figure 7A:
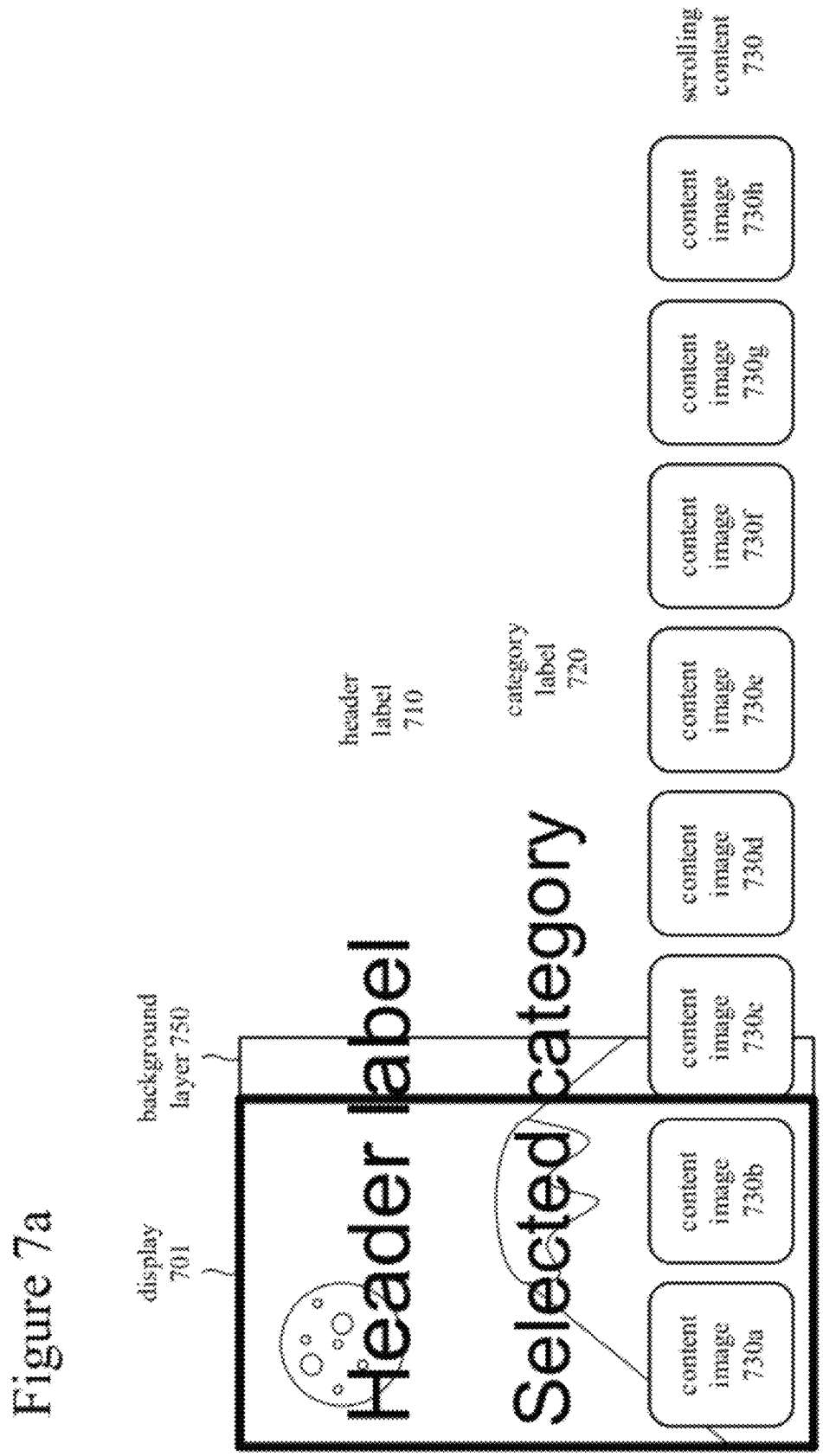
FIGS. 7a-7d are diagrams showing re-positioning of target UI elements in a control in a UI, where the horizontal positions of the target UI are varied according to key frame animations whose source is set to horizontal position of scrolling content.

In FIG. 7a, the display (701) shows the header label (710), category label (720), content (730) and background image (750) in initial positions aligned at the left of the display. In the display (702) of FIG. 7b, two new content images (730c and 730d) have scrolled into view, the category label (720) has scrolled at a lower rate, the header label (710) has scrolled at an even lower rate, and the background image (750) has scrolled slightly. The display (703) of FIG. 7c shows similar scrolling adjustments at the same rates, respectively. In the display (704) of FIG. 7d, the end of the scrolling content (730) is reached, and the header label (710), category label (720), content (730) and background image (750) are shown in final positions aligned at the right of the display.

In the example of FIGS. 7a-7d, a UI element can have a negative horizontal position to indicate a start before the edge of the display. Table 3 shows example target values for the source UI element and the respective target UI elements of FIGS. 7a-7d. For this table, the rates of the background image, header label and category label are ⅟15, ⅕ and ⅓, respectively, the base rate of the scrolling content.

TABLE 3

Example Target Values for Control of FIGS. 7a-7d.

Figure 7D:
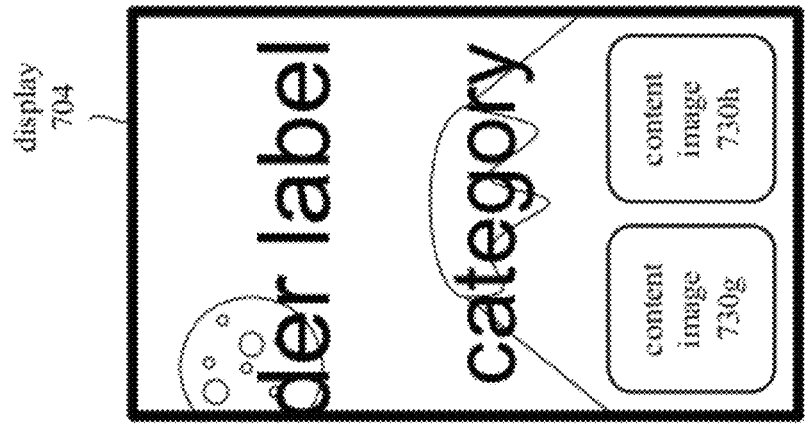
Figure 7C:
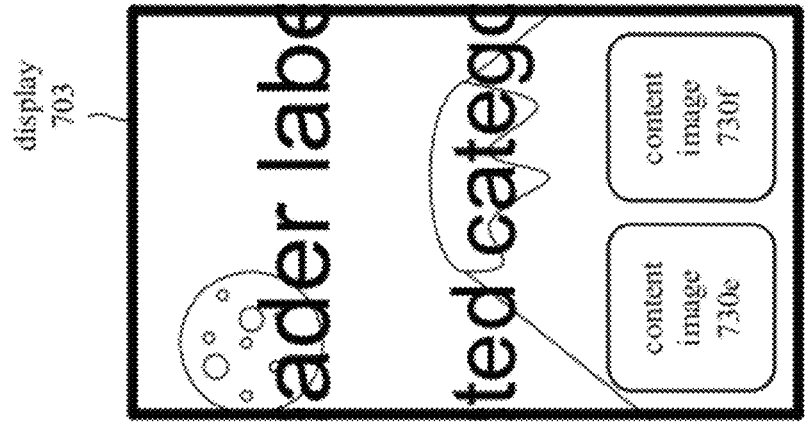
Figure 7B:
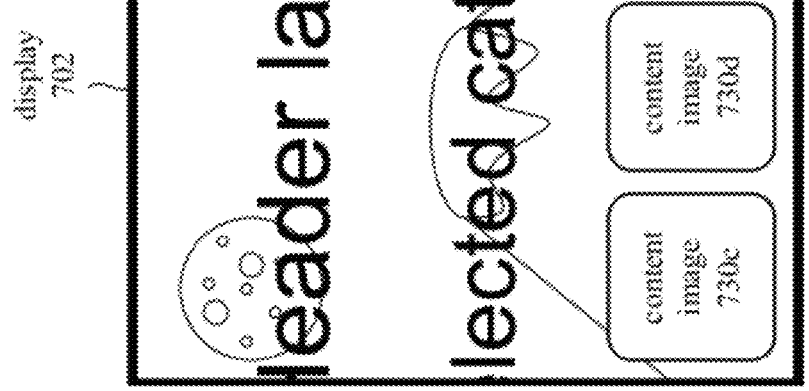

| | FIG. 7a | FIG. 7b | FIG. 7c | FIG. 7d |
|---|---|---|---|---|
| Source Value (PositionX for Scrolling Content) | 0 | −150 | −300 | −450 |
| Target Value (PositionX for Background Image) | 0 | −10 | −20 | −30 |
| Target Value (PositionX for Header Label) | 0 | −30 | −60 | −90 |
| Target Value (PositionX for Category Label) | 0 | −50 | −100 | −150 |

The animation behavior shown in Table 3 and FIGS. 7a-7d can be specified using a multiple of m=−1.0 and two key frames per animation. For example, for each animation, the first key frame is the initial default key frame for which input value (key frame time) is 0 and the property value is 0, and the second key frame has an input value (key frame time) equal to the width of the scrolling content minus the display width (width_diff), e.g., 450. For the category label animation, the second key frame has a property value of −(width_diff/3). Similarly, the second key frame for the header animation has a property value of −(width_diff/5), and the second key frame for the background image has a property value of −(width_diff/15).

FIGS. 8a-8c show re-positioning of a sliding scroll indicator (812) of a scroll bar (810), where the position of the scroll indicator (812) is varied according to a key frame animation. The key frame animation specifies changes in vertical position of the scroll indicator (812). The animation input (time source) for the key frame animation is vertical position of the scrolling content (830a-830s), which is scrolled vertically according to finger gesture input on a touchscreen display. The scrolling content (830) moves at a base rate that corresponds to the rate indicated with gesture input. The scroll indicator (812) is set to scroll vertically at a lower rate and in the opposite direction as the scrolling of the content (830).

In FIG. 8a, the display (801) shows the content (830) and scroll indicator (812) in initial positions at the top of the display (801). In the display (802) of FIG. 8b, six new content images (830i to 830n) have scrolled upward into view, and the scroll indicator (812) has scrolled in the opposite direction downward to the middle of the scroll bar (810). In the display (803) of FIG. 8c, the end of the scrolling content (830) is reached, and the content (830) and scroll indicator (812) are shown in final positions.

Table 4 shows example target values for the source UI element (content (830)) and target UI element (indicator (812)). As the user scrolls down through the scroll content region, the vertical position (PositionY) of the scroll content region decreases in value, but the vertical position (PositionY) of the scroll indicator increases in value at a proportional rate.

TABLE 4

Example Target Values for Control of FIGS. 8a-8c.

| | FIG. 8a | FIG. 8b | FIG. 8c |
|---|---|---|---|
| Source Value (PositionY for Scrolling Content) | 0 | −420 | −840 |
| Target Value (PositionY for Scroll Indicator) | 0 | 200 | 400 |

The animation behavior shown in Table 4 and FIGS. 8a-8c can be specified using a multiple of m=−1.0 and two key frames for the scroll indicator animation. For example, according to the first key frame, when the input value (key frame time) is 0, the property value of the vertical position of the scroll indicator is 0. According to the second key frame, the input value (time) of the key frame is the maximum value for the scroll content region (scrolled to the end of the content), and the property value of the key frame is the maximum value for the scroll indicator (scrolled to the bottom of the scroll bar). A source variable is created that is tied to the vertical position (PositionY) of the scroll content region. The source of the scroll indicator animation is set to the source variable. Other properties of the scroll indicator can similarly be animated as a function of a property of the scroll content region. For example, the width of the scroll indicator can vary in inverse proportion to the length of the scroll content region.

VI. Example Computing Devices.

Figure 9:
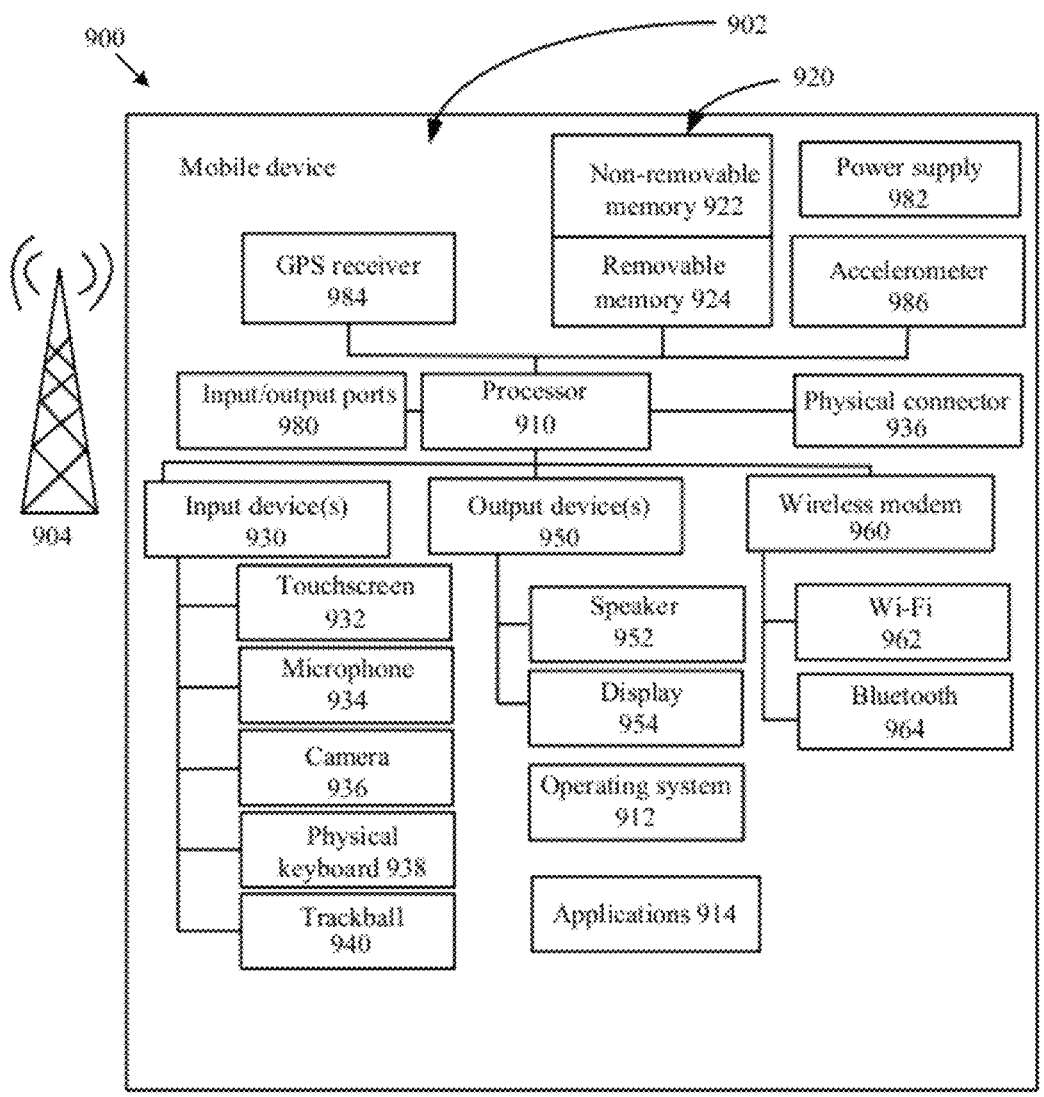
FIG. 9 is a block diagram illustrating a generalized example of a mobile computing device in which one or more described embodiments may be implemented.

FIG. 9 is a system diagram depicting an exemplary mobile device (900) including a variety of optional hardware and software components, shown generally at (902). Any components (902) in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks (904), such as a cellular or satellite network.

The illustrated mobile device can include a controller or processor (910) (e.g., signal processor, microprocessor, ASIC, or other control and processing logic circuitry) for performing such tasks as signal coding, data processing, input/output processing, power control, and/or other functions. An operating system (912) can control the allocation and usage of the components (902) and support for one or more application programs (914). The application programs can include common mobile computing applications (e.g., include email applications, calendars, contact managers, web browsers, messaging applications), or any other computing application.

The illustrated mobile device can include memory (920). Memory (920) can include non-removable memory (922) and/or removable memory (924). The non-removable memory (922) can include RAM, ROM, flash memory, a disk drive, or other well-known memory storage technologies. The removable memory (924) can include flash memory or a Subscriber Identity Module card, which is well known in GSM communication systems, or other well-known memory storage technologies, such as smart cards. The memory (920) can be used for storing data and/or code for running the operating system (912) and the applications (914). Example data can include web pages, text, images, sound files, video data, or other data sets to be sent to and/or received from one or more network servers or other mobile devices via one or more wired or wireless networks.

The mobile device can support one or more input devices (930), such as a touchscreen (932), microphone (934), camera (936), physical keyboard (938) and/or trackball (940) and one or more output devices (950), such as a speaker (952) and a display (954). Other possible output devices (not shown) can include a piezoelectric or other haptic output device. Some devices can serve more than one input/output function. For example, touchscreen (932) and display (954) can be combined in a single input/output device.

Touchscreen (932) can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens.

A wireless modem (960) can be coupled to an antenna (not shown) and can support two-way communications between the processor (910) and external devices. The modem (960) is shown generically and can include a cellular modem for communicating with the mobile communication network (904) and/or other radio-based modems (e.g., Bluetooth or Wi-Fi). The wireless modem (960) is typically configured for communication with one or more cellular networks, such as a GSM network for data and voice communications within a single cellular network, between cellular networks, or between the mobile device and a public switched telephone network.

The mobile device can further include at least one input/output port (980), a power supply (982), a satellite navigation system receiver (984), such as a global positioning system receiver, an accelerometer (986), a transceiver (988) (for wirelessly transmitting analog or digital signals) and/or a physical connector (990), which can be a USB port, IEEE 1394 (firewall) port, and/or RS-232 port. The illustrated components (902) are not required or all-inclusive, as components can be deleted and other components can be added.

For the sake of presentation, the detailed description uses terms like "determine" and "perform" to describe computer operations in a computing environment. These terms are high-level abstractions for operations performed by a computer, and should not be confused with acts performed by a human being. The actual computer operations corresponding to these terms vary depending on implementation.

VII. Alternatives.

Various alternatives to the example implementations presented herein are possible. Many examples presented herein involve key frame animations that are specified using markup language. Alternatively, one or more of the described techniques and tools is applied for another type of animation and/or for an animation specified in some way other than markup language. Also, although many examples presented herein involve a target GUI element and source GUI element, the described techniques and tools are more generally applicable for a target object and source.

More generally, techniques described with reference to flowchart diagrams can be altered by changing the ordering of stages shown in the flowcharts, by repeating or omitting certain stages, etc. As another example, systems described with reference to system diagrams can be altered by changing the ordering of processing stages shown in the diagrams, by repeating or omitting certain stages, etc. As another example, user interfaces described with reference to diagrams can be altered by changing the content or arrangement of user interface features shown in the diagrams, by omitting certain features, etc. As another example, although some implementations are described with reference to specific devices and user input mechanisms (e.g., mobile devices with a touch-screen interface), described techniques and tools can be used with other devices and/or other user input mechanisms.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method comprising:
   determining an animation for a target graphical user interface (GUI) element;
   setting an input of the animation to relate to a property of a source GUI element, wherein a key frame of the animation specifies, for a point at the key frame of the animation, a specific value of a property of the target GUI element at a specific value of the input of the animation set to relate to the property of the source GUI element; and
   with a computing device that implements a rendering engine, at runtime, rendering for display the target GUI element according to the animation and runtime value of the property of the source GUI element, wherein the rendering includes iteratively:
   determining the runtime value of the property of the source GUI element;
   normalizing the runtime value of the property of the source GUI element according to length of the animation; and
   interpolating within the animation to compute a runtime value of the property of the target GUI element at the normalized runtime value of the property of the source GUI element.

2. The method of claim 1 wherein the computing device that implements the rendering engine performs the setting when processing markup language for the target GUI element.

3. The method of claim 1 wherein the setting includes:
   calling a programming interface that returns a source variable whose value depends on the runtime value of the property of the source GUI element; and
   assigning the source variable to an animation input property of the animation.

4. The method of claim 1 wherein the animation for the target GUI element is a first animation for a first target GUI element, the method further comprising:
   determining a second animation for a second target GUI element;
   setting an input of the second animation to relate to the property of the source GUI element; and
   at runtime, rendering for display the second target GUI element according to the second animation and the runtime value of the property of the source GUI element;
   whereby the rendering of first and second target GUI elements changes as a function of the property of the source GUI element.

5. The method of claim 1 wherein the animation includes plural key frames that specify different values of the property of the target GUI element.

6. The method of claim 1 wherein the rendering further includes, for an iteration of the iteratively rendering:
   before the normalizing, adjusting the determined runtime value of the property of the source GUI element according to one or more adjustment parameters, wherein the adjusted runtime value is normalized.

7. The method of claim 6 wherein the runtime value of the property of the source GUI element is a scalar, and wherein the setting includes specifying the one or more adjustment parameters, the one or more adjustment parameters indicating a multiplier, exponent and/or offset of the runtime value of the property of the source GUI element for the animation.

8. A computer-readable memory storing computer-executable instructions for causing a computing device programmed thereby to perform a method comprising:
   providing a programming interface that facilitates binding of an input of an animation to a given source other than time, wherein the animation specifies variations in value of a property of a target object along a length of the animation, and wherein a key frame for the animation indicates, for a point at the key frame of the animation, a specific value of the property of the target object at a specific value of the input of the animation bound to the given source other than time, thereby facilitating rendering for display the property of the target object according to the animation and runtime value of the given source, wherein the rendering includes iteratively:
   determining the runtime value of the given source;
   normalizing the runtime value of the given source according to the length of the animation; and
   interpolating within the animation to compute a runtime value of the property of the target object at the normalized runtime value of the given source;
   receiving a call to the programming interface; and
   returning from the call.

9. The computer-readable memory of claim 8 wherein the call to the programming interface includes a property parameter that identifies the given source and one or more adjustment parameters that indicate adjustments to the runtime value of the given source, and wherein the call returns a source variable whose value depends on the runtime value of the given source.

10. The computer-readable memory of claim 9 wherein the runtime value of the given source is a scalar floating point value, and wherein the one or more adjustment parameters include at least one of a multiplier, an exponent and an offset for the runtime value of the given source.

11. The computer-readable memory of claim 8 wherein the method further comprises processing a specification for the animation, and wherein the specification includes:
   one or more statements at least in part defining the animation; and
   one or more statements setting the input of the animation to the given source; and
   one or more statements defining the key frame for the animation.

12. In a computing device that implements a rendering engine, a method comprising:
   with the computing device that implements the rendering engine, determining a first animation for a first target object that has a first target object property, wherein the first animation specifies variations in value of the first target object property along a length of the first animation, wherein an animation input of the first animation is set to a given source other than time, and wherein a key frame for the first animation indicates, for a point at the key frame of the first animation, a specific value of the first target object property at a first specific value of the animation input of the first animation set to the given source other than time;

with the computing device that implements the rendering engine, determining a second animation for a second target object that has a second target object property, wherein the second animation specifies variations in value of the second target object property along a length of the second animation, wherein an animation input of the second animation is also set to the given source other than time, and wherein a key frame for the second animation indicates, for a point at the key frame of the second animation, a specific value of the second target object property at a second specific value of the animation input of the second animation set to the given source other than time; and with the computing device that implements the rendering engine, iteratively rendering the first target object and the second target object at runtime, including:

evaluating the first animation based on a runtime value of the given source, including:

normalizing the runtime value of the given source according to the length of the first animation, to produce a first normalized runtime value of the given source; and interpolating within the first animation to compute a runtime value of the first target object property at the first normalized runtime value of the given source; and evaluating the second animation based on the value of the given source, including:

normalizing the runtime value of the given source according to the length of the second animation, to produce a second normalized runtime value of the given source; and interpolating within the second animation to compute a runtime value of the second target object property at the second normalized value of the given source.

13. The method of claim 12 further comprising performing the determining and the rendering for each of one or more other target objects using the given source for the first target object and the second target object.

14. The method of claim 12 wherein the first animation includes one or more other key frames for one or more different values of the animation input of the first animation, each of the one or more other key frames indicating a different value of the first target object property for a different one of the one or more different values of the animation input.

15. The method of claim 14 wherein a markup language specification includes statements that at least in part define the first animation, the method further comprising:

with the computing device that implements the rendering engine, processing a script separate from the markup language specification to add the one or more other key frames.

16. The method of claim 12 wherein:

the evaluating the first animation further includes adjusting the runtime value of the given source according to a first parameter for the first animation;

the evaluating the second animation further includes adjusting the runtime value of the given source according to a second parameter for the second animation, wherein the first parameter is different than the second parameter.

17. The method of claim 12 wherein:

the evaluating the first animation further comprises adjusting the runtime value of the given source for purposes of the first animation, to produce a first adjusted runtime value of the given source, wherein the first adjusted runtime value of the given source is normalized according to the length of the first animation; and the evaluating the second animation further comprises adjusting the runtime value of the given source for purposes of the second animation, to produce a second adjusted runtime value of the given source, wherein the second adjusted runtime value of the given source is normalized according to the length of the second animation.

18. The method of claim 12 further comprising:

with the computing device that implements the rendering engine, creating a first source variable whose value depends at least in part on the runtime value of the given source, wherein the animation input of the first animation is set to the first source variable; and with the computing device that implements the rendering engine, creating a second source variable whose value depends at least in part on the runtime value of the given source, wherein the animation input of the second animation is set to the second source variable.

19. The method of claim 18 wherein the value of the first source variable further depends at least in part on a first adjustment parameter specified for the first source variable, and wherein the value of the second source variable further depends at least in part on a second adjustment parameter specified for the second source variable.

20. A computer-readable memory storing computer-executable instructions for causing a computing device programmed thereby to perform a method comprising:

determining an animation for a target graphical user interface (GUI) element;

setting an input of the animation to relate to a property of a source GUI element, wherein a key frame of the animation specifies, for a point at the key frame of the animation, a specific value of a property of the target GUI element at a specific value of the input of the animation set to relate to the property of the source GUI element; and at runtime, rendering for display the target GUI element according to the animation and runtime value of the property of the source GUI element, wherein the rendering includes iteratively:

determining the runtime value of the property of the source GUI element;

normalizing the runtime value of the property of the source GUI element according to length of the animation; and interpolating within the animation to compute a runtime value of the property of the target GUI element at the normalized runtime value of the property of the source GUI element.

21. The computer-readable memory of claim 20 wherein the setting includes:

calling a programming interface that returns a source variable whose value depends on the runtime value of the property of the source GUI element; and assigning the source variable to an animation input property of the animation.

22. The computer-readable memory of claim 20 wherein the rendering further includes, for an iteration of the iteratively rendering:

before the normalizing, adjusting the determined runtime value of the property of the source GUI element according to one or more adjustment parameters, wherein the adjusted runtime value is normalized.

23. The computer-readable memory of claim 22 wherein the runtime value of the property of the source GUI element is a scalar, and wherein the setting includes specifying the one or more adjustment parameters, the one or more adjustment parameters indicating a multiplier, exponent and/or offset of the runtime value of the property of the source GUI element for the animation.

24. The method of claim 1 wherein the normalizing maps the runtime value of the property of the source GUI element from a source value range to a normalized value range that matches the length of the animation.

* * * * *